(12) United States Patent
Nakata

(10) Patent No.: US 7,388,823 B2
(45) Date of Patent: Jun. 17, 2008

(54) OPTICAL PICKUP, MANUFACTURING METHOD THEREOF, AND OPTICAL DISK SYSTEM

(75) Inventor: Naotaro Nakata, Kyoto (JP)

(73) Assignee: RHOM Co., Ltd, Kyoto-Shi (JP)

( * ) Notice: Subject to any disclaimer, the term of this patent is extended or adjusted under 35 U.S.C. 154(b) by 488 days.

(21) Appl. No.: 10/392,074

(22) Filed: Mar. 19, 2003

(65) Prior Publication Data

US 2003/0185138 A1 Oct. 2, 2003

(30) Foreign Application Priority Data

Mar. 27, 2002 (JP) .............................. 2002-087698

(51) Int. Cl.
*G11B 7/00* (2006.01)
(52) U.S. Cl. ...................... 369/116; 369/121
(58) Field of Classification Search ............ 369/112.1, 369/121, 122, 116; *G11B 7/00*
See application file for complete search history.

(56) References Cited

U.S. PATENT DOCUMENTS

| | | | |
|---|---|---|---|
| 5,198,873 A * | 3/1993 | Ishizuka et al. ............ | 356/494 |
| 5,315,573 A * | 5/1994 | Nakao et al. ............... | 369/100 |
| 5,905,699 A * | 5/1999 | Ishibashi ................. | 369/44.26 |
| 6,011,769 A * | 1/2000 | Takahara .................... | 369/121 |
| 6,021,145 A * | 2/2000 | Naiki et al. ............ | 372/50.122 |
| 6,421,314 B1 * | 7/2002 | Maruyama .................. | 369/116 |
| 6,631,047 B2 * | 10/2003 | Ishizuka et al. ......... | 360/77.03 |
| 6,914,682 B2 * | 7/2005 | Kato ........................... | 356/493 |
| 2003/0185138 A1 | 10/2003 | Nakata | |

FOREIGN PATENT DOCUMENTS

| | | |
|---|---|---|
| JP | 06-132587 | 5/1994 |
| JP | 06-223399 | 8/1994 |
| JP | 09-237914 | 9/1997 |

OTHER PUBLICATIONS

Electronics Letters, vol. 20, No. 20, pp. 821-822.

* cited by examiner

*Primary Examiner*—Aristotelis M Psitos
(74) *Attorney, Agent, or Firm*—James V. Costigan; Hedman & Costigan, P.C.

(57) ABSTRACT

An optical pickup for reading information written on an optical disk is equipped with a vertical multi-mode converted laser diode which emits light, means for focusing the emitted light from the laser diode onto the optical disk, and means for receiving reflected light from the optical disk in order to read the information written on the optical disk, wherein the coherent distance of the emitted light from the laser diode is made shorter than the optical path length of the optical pickup.

3 Claims, 9 Drawing Sheets

Coherent Output (2) visibility — Distance

Light Intensity (1) Waveform of Emitted Light — Time

OPTICAL PICKUP, MANUFACTURING METHOD THEREOF, AND OPTICAL DISK SYSTEM

BACKGROUND OF THE INVENTION

1. Field of the Invention

The present invention is related to an optical pickup which reads information written on an optical disk using a laser diode, a manufacturing method thereof, and an optical disk system equipped with such optical pickup.

2. Description of the Related Art

In a DVD, MO, CD-R/RW, or DVD-R/RW/RAM system or the like which reads information written on an optical disk, a laser diode is used as the light source of an optical pickup. FIG. 9 shows the rough structure of an optical pickup 31 for reading information recorded on an optical disk 36. The optical pickup 31 is equipped with a laser diode 32, a half mirror 33, a collimator lens 34, an objective lens 35 and a light detector 37. The emitted light from the laser diode 32 is reflected by the half mirror 33 and formed into a parallel beam of light by the collimating lens 34. The parallel beam of light is focused on the optical disk 36 by the objective lens 35. The reflected light from the optical disk 36 passes through the objective lens 35 and the collimating lens 34, and is detected by the light detector 37 after being transmitted through the half mirror 33. The half mirror 33 transmits about 50% of the incident light, and reflects about 50% of the incident light. For this reason, one portion of the reflected light from the optical disk returns to the laser diode without being directed to the primary light detector 37. This is called feed-back. The feed-back to the laser diode 32 from the optical disk interferes with the light emission of the laser diode 32, and this generates feed-back noise in the emitted light of the laser diode 32.

A measurement system for measuring feed-back noise is shown in FIG. 1. In FIG. 1, the measurement system includes a laser diode 11, a collimator lens 12, a half mirror 13, an attenuator 14, a total reflection mirror 15, an objective lens 16, a light detector 17 and a noise measuring device 18. The emitted light from the laser diode 11 is formed into a parallel beam of light by the collimator lens 12, and then separated into two parallel beams of light by the half mirror 13. One separated parallel beam of light receives a required attenuation by the attenuator 14, and returns to the laser diode 11 after being reflected by the total reflection mirror 15. The other separated parallel beam of light is focused by the objective lens 16 and received by the light detector 17. The amount of noise in the received emitted light from the laser diode 11 is measured by the noise measuring device 18. In this measuring system, it is possible to measure the effect of the amount of feed-back with respect to the feed-back noise by adjusting the amount of attenuation of the attenuator 14.

In order to prevent feed-back noise, a method of superimposing a high-frequency electric current on the direct electric current driving the laser diode has been proposed (Electronics Letters, vol. 20, No. 20, pp. 821-822). FIG. 2 shows the emitted light at the time a high-frequency electric current is superimposed on the direct electric current when the laser diode is driven. In FIG. 2, when a sinusoidal high-frequency electric current is superimposed on the direct electric current serving as a driving current, the emitted light forms pulses. This proposal uses the phenomenon of multi-mode light emission carried out at the times when the emission of light is begun again after a high-frequency electric current momentarily forces the direct electric current below the threshold value of the laser diode when the high-frequency electric current is superimposed on the direct electric current when the laser diode is driven.

In this proposal, the distance from the laser diode to a reflector is 100 mm, and a 1 GHz high-frequency electric current is superimposed. In this case, the laser diode repeatedly carries out a pulse light emission operation in which light is emitted for a period of 500 psec, and then the emission of light is turned off for a period of 500 psec. Because light will travel approximately 150 mm in 500 psec, in a measurement system having a round trip distance of 200 mm from the laser diode to the reflector, during the state where the emission of light from the laser diode is turned off, the emitted light from the previous light emitting state is reflected by the reflector and forms feed-back (feed-back A in FIG. 2). This feed-back returns during the time from the light emission turning off state to the next light emitting state. When the laser diode repeatedly carries out a pulse light emission operation by alternating between a light emitting state and a light emission turning off state, there is no coherence correlation between the emitted light from the laser diode at the time of the previous light emitting state and the emitted light from the laser diode at the time of the next light emitting state. As a result, because there is no coherent interaction between the feed-back and the emitted light of the next light emitting state, the feed-back noise can be suppressed to a relatively low level.

In accordance with the miniaturization of the latest optical pickups, the distance between the end surface of the laser diode of the optical pickup and the optical disk has been shortened to about 30 mm. Further, the frequency of the superimposing high-frequency electric current has been kept at 300~500 MHz in order to prevent unwanted radiation. For this reason, because the emitted light from the laser diode during the period of the light emitting state is reflected by the optical disk and forms feed-back (feed-back B in FIG. 2), such feed-back interferes with the light emission from the laser diode, and this generates a large amount of feed-back noise.

Further, a self-pulsation laser diode has also been developed in order to reduce the feed-back noise. This laser diode carries out a pulse light emission operation in which when the laser diode begins emitting light, the absorption coefficient and the like at the emission light wavelength are changed, and the emission of light is turned off, and when the emission of light is turned off, the absorption coefficient and the like return, and the laser diode begins emitting light again. From the fact that the self-pulsation laser diode also carries out multi-mode oscillation when the emission of light is begun, it is difficult for feed-back noise to be generated. However, because even the self-pulsation laser diode has a limited pulsation frequency, when the emitted light from the laser diode during the period of the light emitting state is reflected and forms feed-back in the miniaturized optical pickup, such feed-back interferes with the light emission from the laser diode, and there is still the problem of a large amount of feed-back noise being generated in the emitted light of the laser diode.

In the structures of older related art optical pickups, there is a little influence against feed-back in the multi-mode oscillation laser diode, and in the miniaturized optical pickup described above, because the laser diode receives an effect from the feed-back, there has been a need to evaluate the feed-back noise. The effect of superimposing a high-frequency electric current and the effect of self-pulsation can ultimately be evaluated by the noise in the emitted light of the laser diode, but the measurement of noise is extremely complicated, and it is difficult to evaluate the relationship between the amplitude of the superimposed high-frequency electric current and the feed-back noise in a measurement system for evaluating noise due to feedback.

On the other hand, many methods of evaluating the coherence of the emitted light from the laser diode with a Michelson interferometer have been reported. FIG. 3 shows a structure according to the principle of a Michelson interferometer. In FIG. 3, there is a movable mirror 19 and a fixed mirror 20. The emitted light from the laser diode 11 is formed into a parallel beam of light by the collimator lens 12, and then separated into two parallel beams of light by the half mirror 13. One separated parallel beam of light is reflected by the fixed mirror 20, passes through the half mirror 13, and is detected by the light detector 17 via the objective lens 16. The other separated parallel beam of light is reflected by the moving mirror 19, reflected by the half mirror 13, and then detected by the light detector 17 via the objective lens 16. By moving the movable mirror 19, it is possible to change the difference in the distances of the two separated parallel beams of light to the light detector 17. The coherence of the emitted light from the laser diode 11 is measured from the created difference in distance of the movable mirror 19 and the light electric power detected by the light detector 17.

In current Michelson interferometers, measurements can be carried out easily within the range of relatively small differences in distance, but when a considerable difference in distance is formed in the distance from the front facet of the laser diode of the optical pickup to the optical disk, the range in which measurements can be carried out easily is exceeded.

SUMMARY OF THE INVENTION

In order to solve the problems of the related art described above, it is an object of the present invention to simply adjust or select a laser diode which can be applied to an optical pickup.

Instead of carrying out difficult noise measurements, the present inventor carried out an examination by evaluating other indicators. Namely, by observing the coherence of the emitted light of a multi-mode oscillating laser diode with a Michelson interferometer, and by defining the distance where the envelope of the visibility curve falls below a prescribed threshold as the coherent distance, it was discovered that the suppression of feed-back noise was possible when such coherent distance was made shorter than the optical path length of the optical pickup. The optical path length of the optical pickup refers to the distance from the front facet of the laser diode of the optical pickup to the optical disk, and is corrected by the index of refraction and converted into the distance in a vacuum.

The results of the coherence observed by the Michelson interferometer are shown in the graph of the left side of FIG. 4. In the graph of the left side of FIG. 4, the horizontal axis represents the difference in distance to the light detector 17 of the two separated parallel beams of light in FIG. 3, and the vertical axis represents the visibility (coherent output). In a simple Michelson interferometer, because the movable mirror can not be moved much, visibility can only be measured for minute differences in distance, as shown in the graph in the left side of FIG. 4. On the other hand, as shown in FIG. 4, from the fact that the envelope of the visibility curve can be approximated by a Gaussian distribution, in each laser diode, the envelope was extrapolated from the value of $\gamma 1$ of the visibility curve, and the envelope of the visibility curve was assumed to have a constant value. Because $\gamma n$ refers to the ratio of the n'th peak with respect to the center of the visibility curve, $\gamma 1$ refers to the ratio of the next peak with respect to the center of the visibility curve. When such constant value of the envelope of the visibility curve was defined as the coherent distance, it was discovered that the feed-back noise in the emitted light from the laser diode could be lowered below an allowable level when the optical path length of the optical pickup was made longer than the coherent distance. In this regard, the extrapolation technique is not limited to $\gamma 1$, and it is possible to extrapolate the envelope from any n'th $\gamma n$ which can be measured with a simple Michelson interferometer.

In order to achieve the object stated above, a laser diode which can be applied to an optical pickup was selected or adjusted from a comparison of the assumed coherent distance and the optical path length of the optical pickup. Namely, the invention of Claim 1 is an optical pickup equipped with a vertical multi-mode converted laser diode which emits light having a coherent distance that is made shorter than the optical path length of the optical pickup.

In the method of manufacturing an optical pickup according to the invention of Claim 2, the optical pickup is provided with the above described laser diode which is driven by a driving electric current created by superimposing a high-frequency signal on a direct electric current in order to emit light in a vertical multi-mode converted state, and the driving electric current is adjusted so that the coherent distance of the emitted light from the laser diode is made shorter than the optical path length of the optical pickup.

In the invention of Claim 3, an optical disk system is provided with the optical pickup of Claim 1.

In the invention of Claim 4, an optical disk system is provided with an optical pickup manufactured by the manufacturing method of Claim 2.

The present invention makes it unnecessary to carry out complicated noise measuring processes or observations using a large-scale Michelson interferometer, and it is possible to construct an optical pickup having a feedback noise level below an allowable feed-back noise level, and an optical disk system provided with such optical pickup.

DETAILED DESCRIPTION OF THE PREFERRED EMBODIMENTS

The preferred embodiments of the present invention will now be described with reference to the drawings.

Embodiment 1

Figure 5:
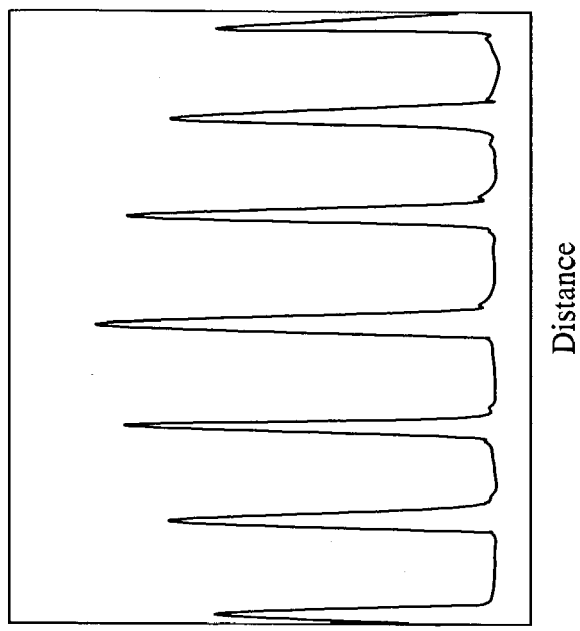
FIG. 5 shows the measurement results of the emitted light on a time axis for the time when a laser diode was driven with a driving electric current created by superimposing a high-frequency electric current on a direct electric current, and the results of the coherence of the emitted light from the laser diode observed with a Michelson interferometer.
Figure 5:
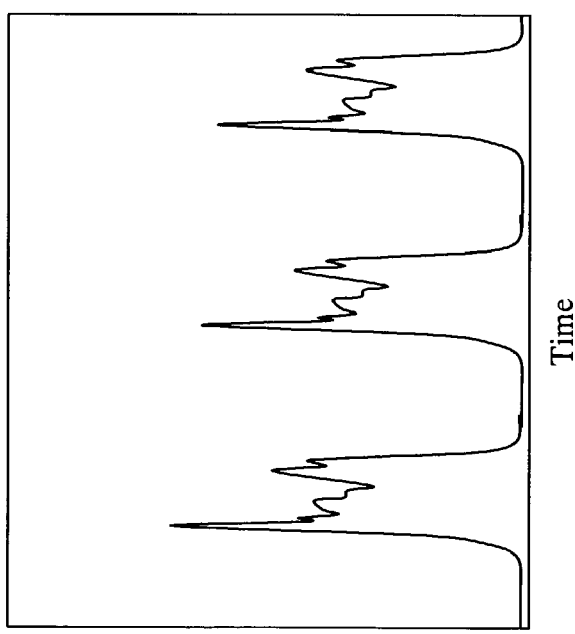

In order to make a laser diode applied to an optical pickup carry out multi-mode light emission, the laser diode was driven with a driving electric current created by superimposing a 330 MHz high-frequency electric current on a direct electric current. The results of the measured emitted light on a time axis for such time are shown in FIG. 5(1). In accordance with the frequency of the high-frequency electric current, a pulse light emission state is formed. At this time, the coherence of the emitted light from the laser diode was observed with a simple Michelson interferometer. The observation results are shown in FIG. 5(2).

Figure 1:
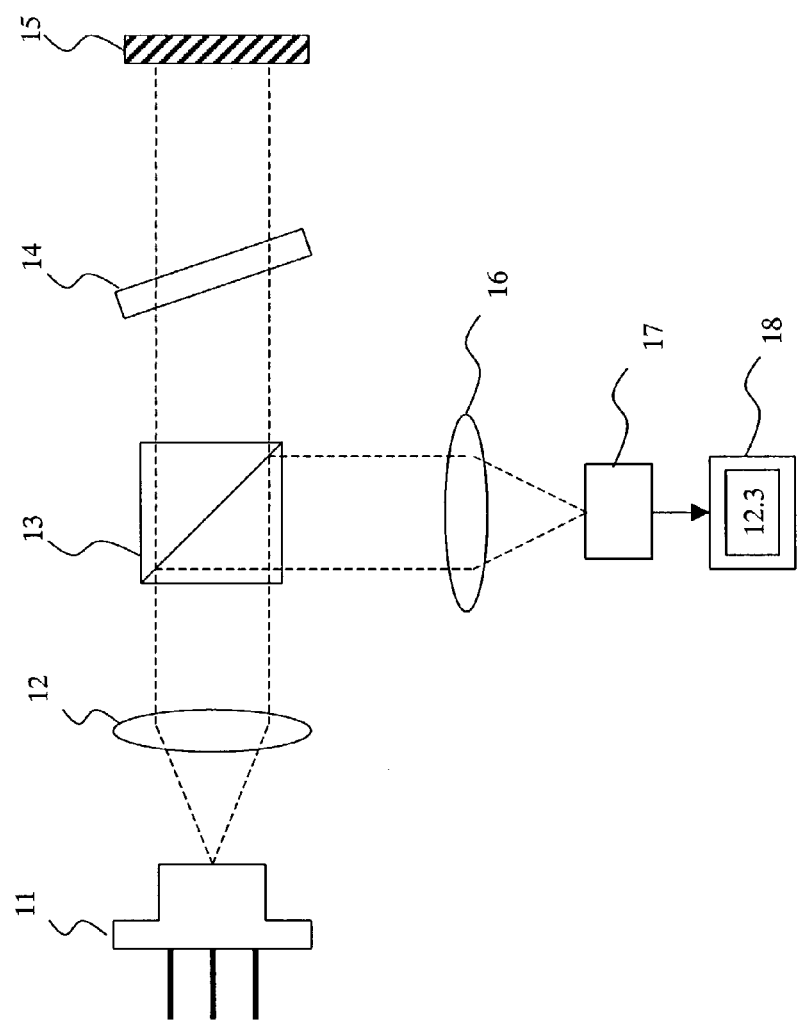
FIG. 1 is a schematic view of a measuring system for measuring feedback noise.
Figure 2:
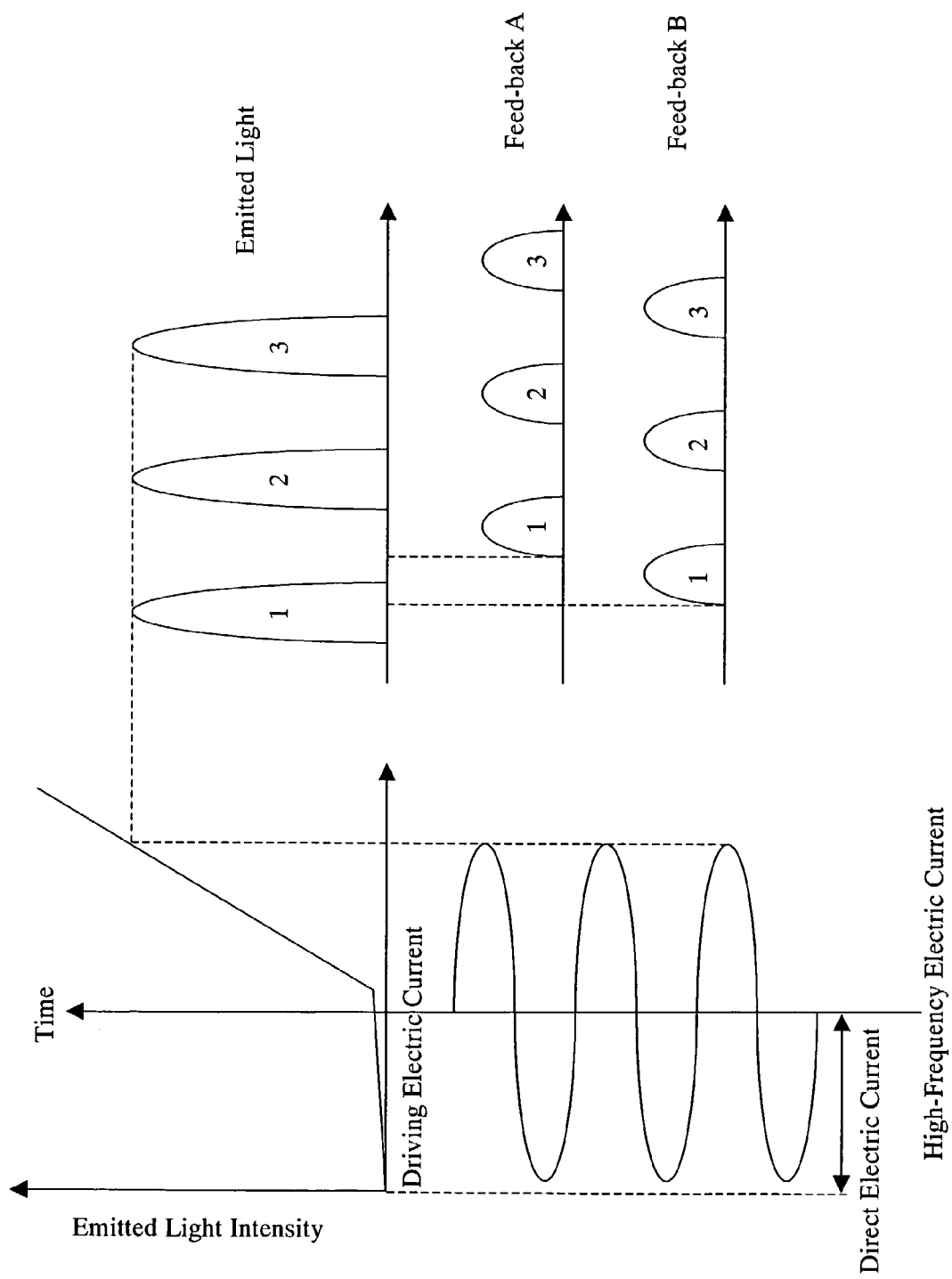
FIG. 2 is a drawing showing the relationship of the light emission with respect to the driving electric current of a laser diode, and the time relationship between the emitted light and the feed-back.
Figure 3:
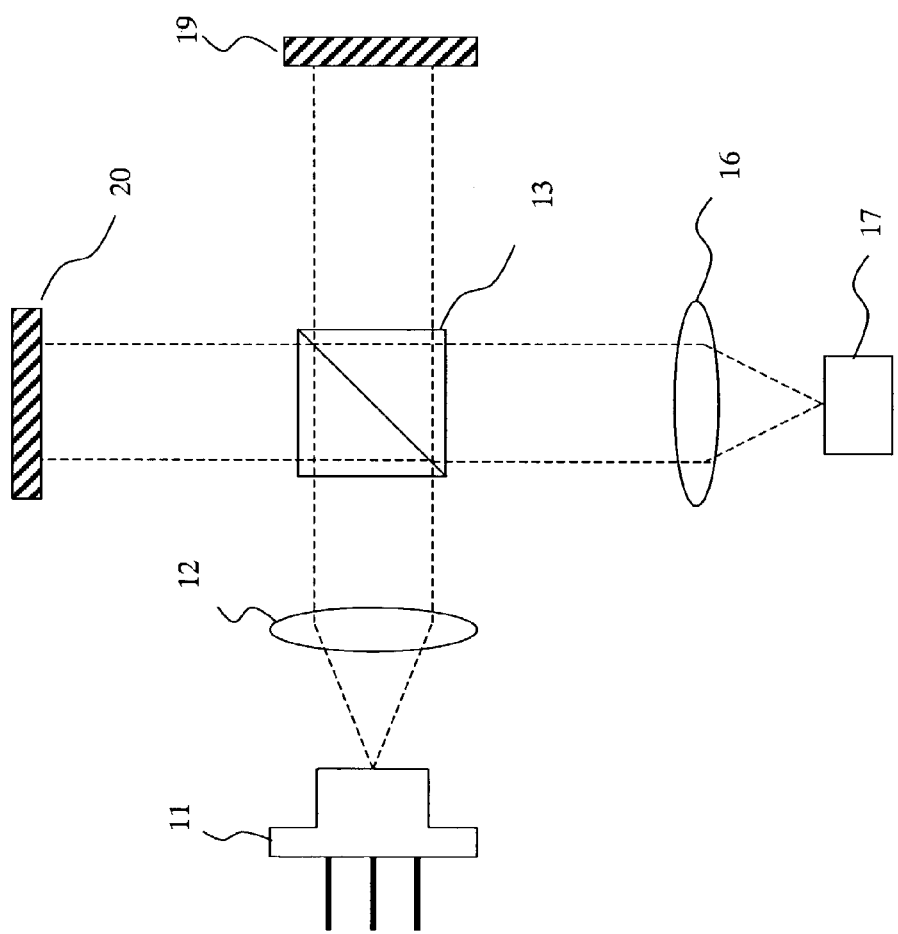
FIG. 3 is a schematic view of a structure according to the measuring principle of a Michelson interferometer.
Figure 4:
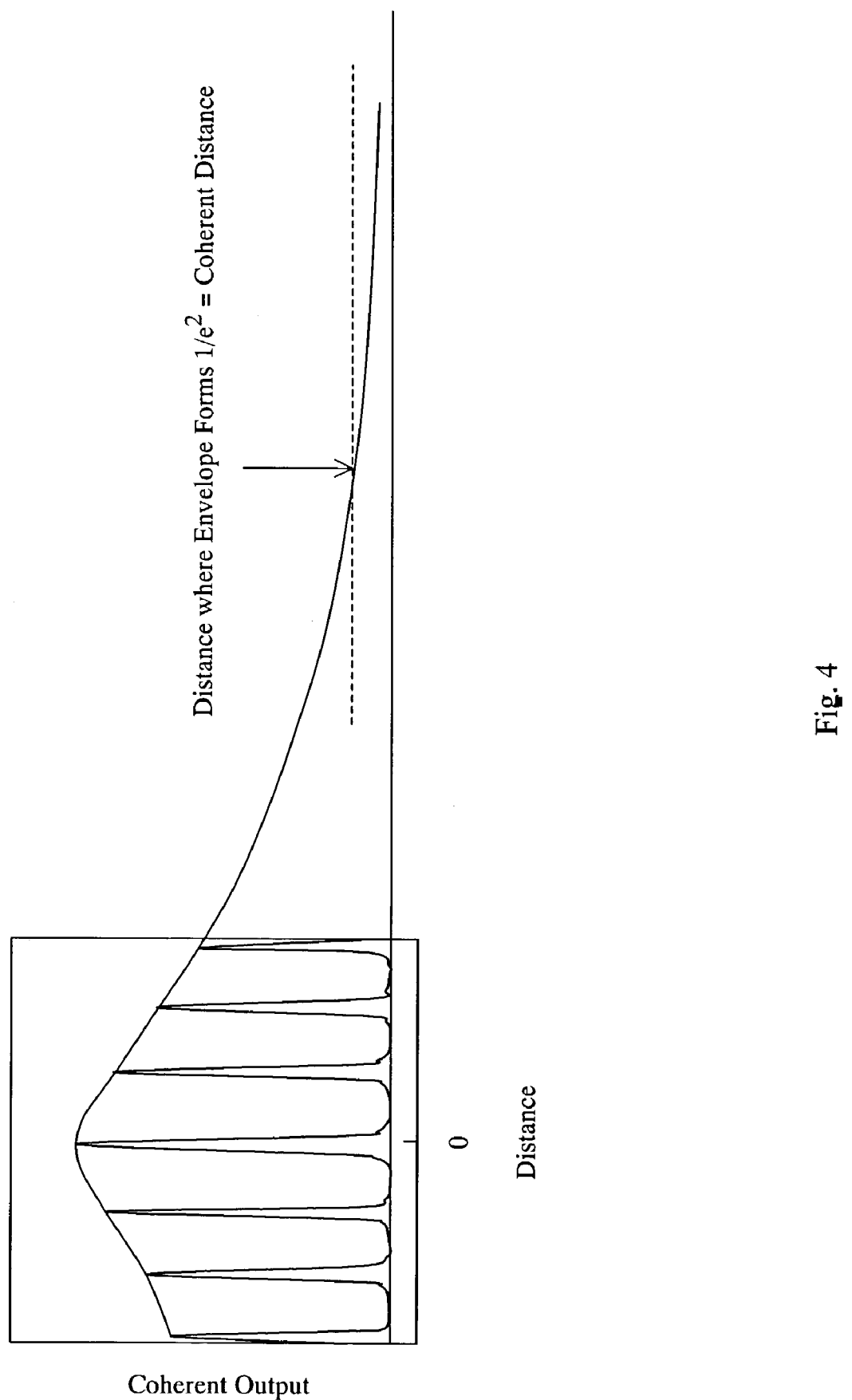
FIG. 4 is a graph showing the results of the coherence of the emitted light from a laser diode observed with a Michelson interferometer.

Based on the results of FIG. 5(2), the envelope of the visibility curve was extrapolated using the technique described for FIG. 4. Then, with the distance where the envelope of the visibility curve forms $1/e^2$, where e is the natural logarithm base, established as the coherent distance, the present inventor discovered that the amount of feed-back noise can be lowered below the allowable feed-back noise level when such coherent distance is made shorter than the optical path length of the optical pickup. The coherent distance obtained from the envelope of the visibility curve of FIG. 5(2) was 47 mm.

Figure 6:
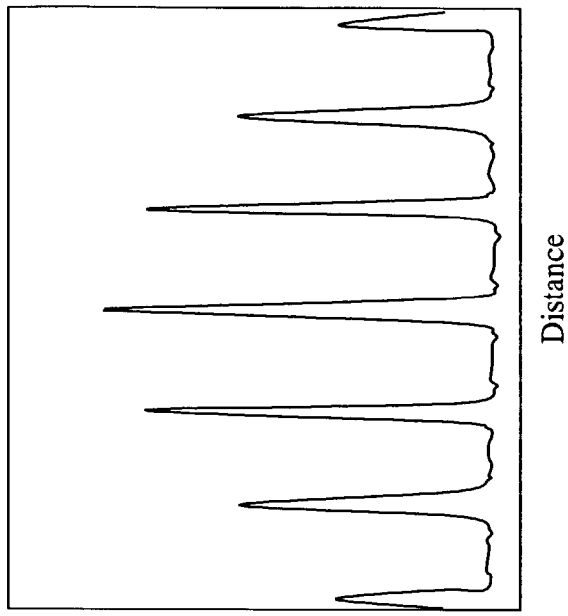
FIG. 6 shows the measurement results of the emitted light on a time axis for the time when a laser diode was driven with a driving electric current created by superimposing a high-frequency electric current on a direct electric current, and the results of the coherence of the emitted light of observed with a Michelson interferometer.
Figure 6:
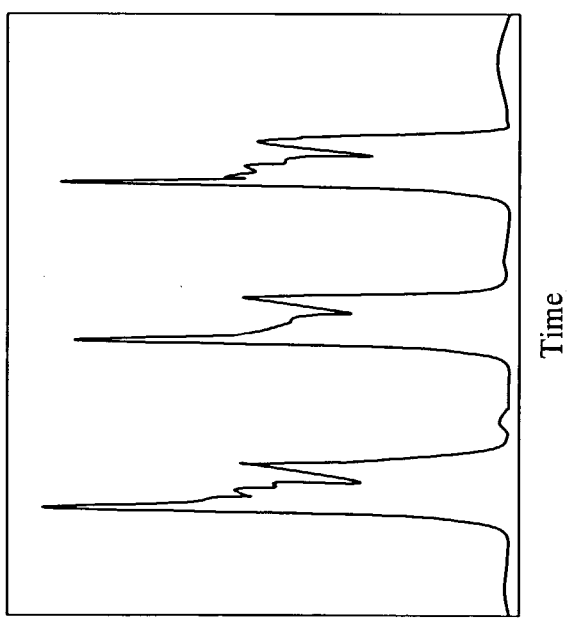

Further, the frequency of the superimposed high-frequency electric current was raised, the direct electric current was lowered, and the amplitude of the high-frequency electric current was raised to drive the laser diode. The results of the measured emitted light on a time axis for such time are shown in FIG. 6(1). Compared with the emitted light of FIG. 5(1), the pulse repetition frequency was increased, and the pulse width was narrowed. At this time, the coherence of the emitted light from the laser diode was observed with a simple Michelson interferometer. The observation results are shown in FIG. 6(2). By comparison with FIG. 5(2), it can be understood that the visibility curve decreases sharply. This happens because the multi-mode conversion at the time of light emission is advanced due to the narrowing of the pulse width described above. The coherent distance obtained from the envelope of the visibility curve of FIG. 6(2) was 27 mm.

Figure 7:
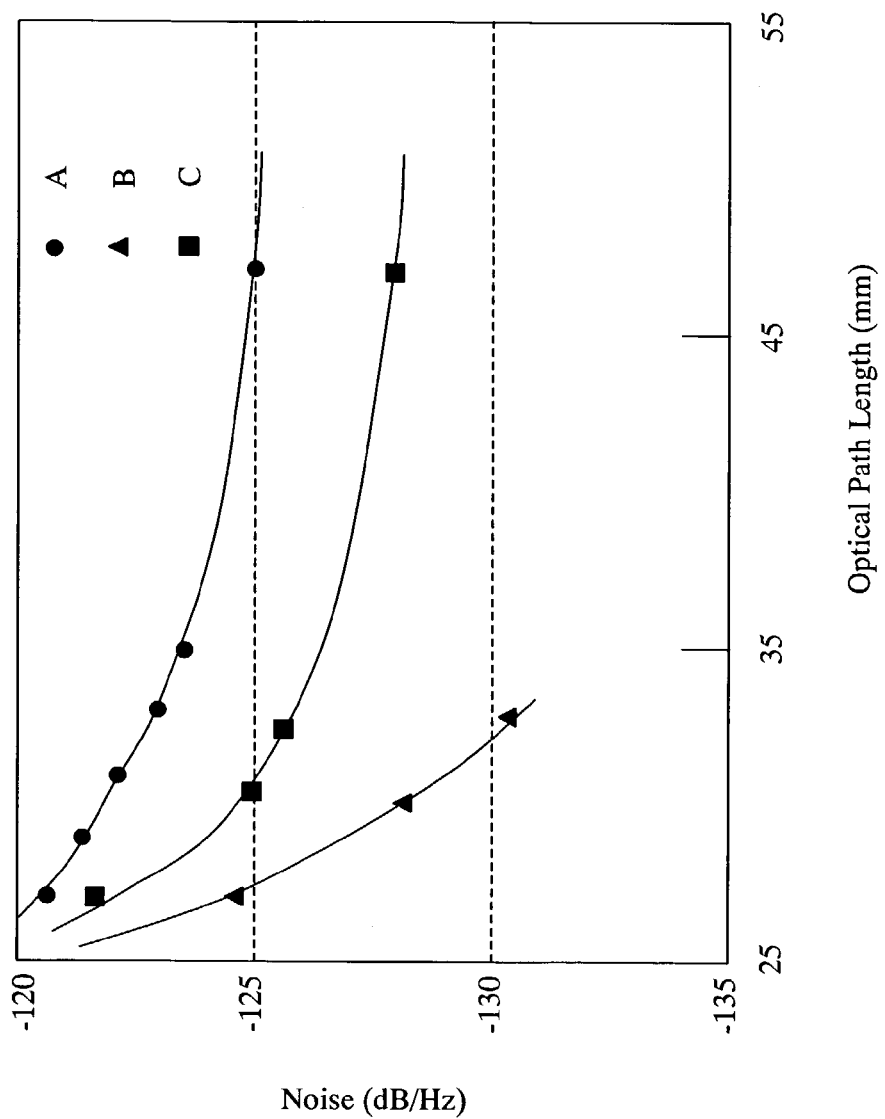
FIG. 7 is a graph showing the measurement results of the feed-back noise of the emitted light from laser diodes with respect to the optical path length of an optical pickup.

Measurements to confirm the validity of the above description were also carried out. Namely, the amount of feed-back noise when the optical path length of the optical pickup is changed was measured for the states of FIG. 5 and FIG. 6. The measurement results are shown in FIG. 7. In FIG. 7, the horizontal axis represents the optical path length of the optical pickup, and the vertical axis represents the feed-back noise. In FIG. 7, A represents the state of FIG. 5, and B represents the state of FIG. 6. In FIG. 7, from the fact that the allowable level of feed-back noise is −125 dB/Hz, the optical path length of the optical pickup allowed in the case of A is 49 mm, and the optical path length of the optical pickup allowed in the case of B is 27 mm. It is understood that there is a good match with the coherent distance calculated in advance from the visibility curve.

From the present embodiment, the distance where the envelope of the visibility curve forms $1/e^2$ was established as the coherent distance, the laser diode was driven with a driving electric current created by superimposing a high-frequency electric current on a direct electric current, and by adjusting the driving electric current of the laser diode so that the coherent distance of the emitted light from the vertical multi-mode converted laser diode becomes shorter than the optical path length of the optical pickup, it was confirmed that it is possible to construct an optical pickup having a feed-back noise level below the allowable feed-back noise level.

As is clear from the above description, the method of manufacturing the present optical pickup makes it unnecessary to carry out complicated noise measuring processes or observations using a large-scale Michelson interferometer, and it is possible that the feed-back noise level was lowered below the allowable feed-back noise level by in the optical pickup equipped with the laser diode in which the coherent distance of the emitted light from the vertical multi-mode converted laser diode was made shorter than the optical path length of the optical pickup.

Embodiment 2

Coherence was measured for the case where a different laser diode was driven under the same driving electric current conditions as FIG. 5. At this time, the distance where the envelope of the visibility curve forms $1/e^2$, namely, the coherent distance was 30 mm. In this state, measurements of the amount of noise when the optical path length of the optical pickup is changed were carried out. The measurement results are shown in FIG. 7 (C of FIG. 7) together with the measurement results of Embodiment 1. In FIG. 7, from the fact that the allowable level of feed-back noise is −125 dB/Hz, the optical path length of the optical pickup allowed in the case of C is 30 mm. It is understood that there is a good match with the coherent distance calculated in advance from the visibility curve.

Accordingly, it is possible to select the present laser diode in an optical pickup having an optical path length of 30 mm or longer. Even in the case of a self-pulsation laser diode, by selecting a laser diode in which the coherent distance of the emitted light from the laser diode is shorter than the optical path length of the optical pickup, it is possible to install such laser diode in the optical pickup.

As described in the present embodiment, by providing an optical pickup with a laser diode selected so that the coherent distance of the emitted light from the laser diode is shorter than the optical path length of the optical pickup, it was possible to construct an optical pickup having a feed-back noise level below the allowable feed-back noise level.

As is clear from the above description, the present optical pickup makes it unnecessary to carry out complicated noise measuring processes or observations using a large-scale Michelson interferometer, and in the optical pickup equipped with the laser diode in which the coherent distance of the emitted light from the vertical multi-mode converted laser diode was made shorter than the optical path length of the optical pickup, it is possible that the feed-back noise level was lowered below the allowable feed-back noise level.

Embodiment 3

Figure 8:
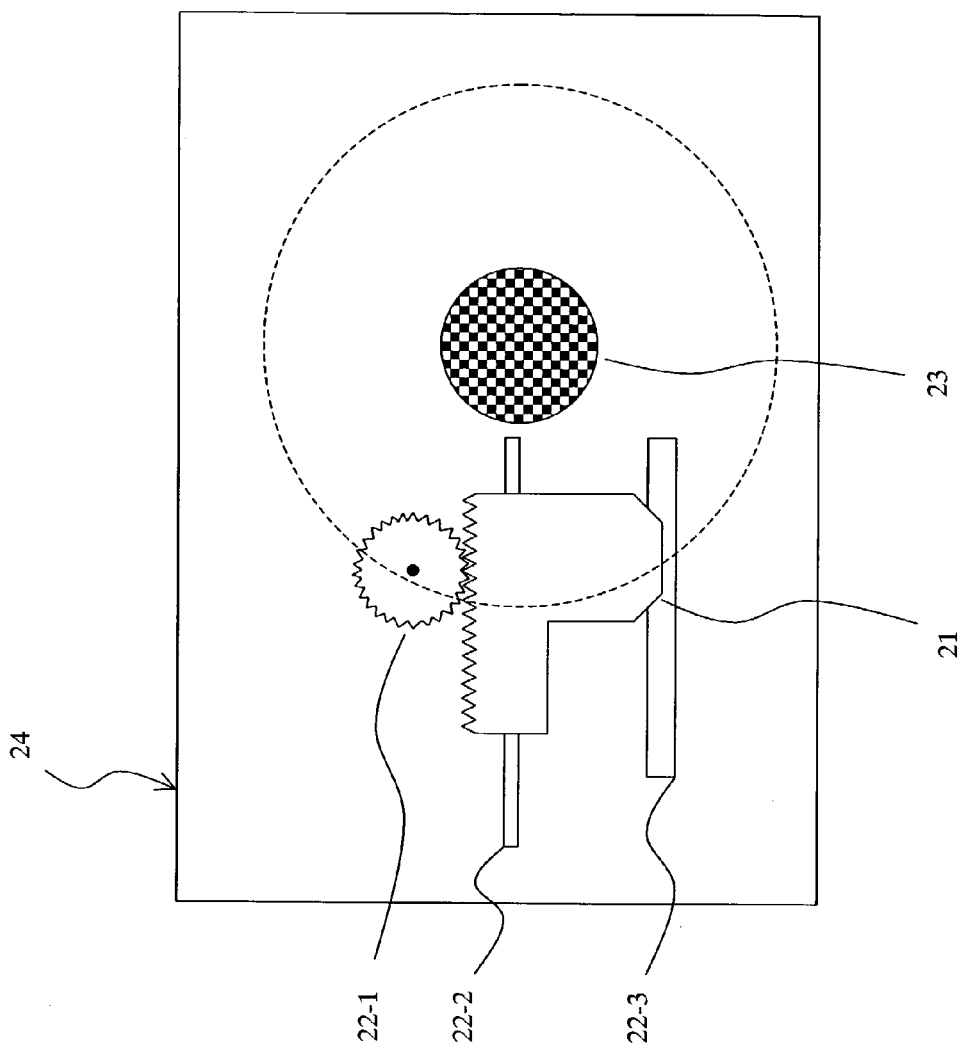
FIG. 8 is a schematic view of the structure of an optical disk system.
Figure 9:
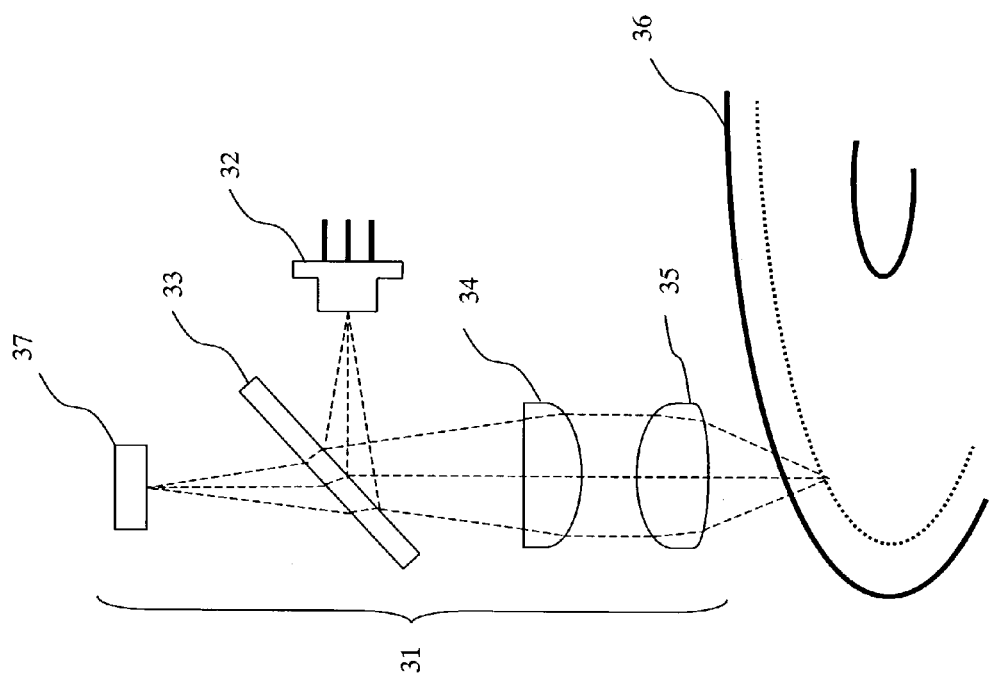
FIG. 9 is a schematic view of the structure of an optical pickup.

As shown in FIG. 8, an optical disk system includes an optical pickup 21, an optical pickup sliding mechanism 22, and an optical disk rotating mechanism 23. The optical pickup sliding mechanism 22 is a mechanism for sliding the optical pickup 21, and is equipped with a gear wheel (22-1) and a rail mechanism (22-1 and 22-3) and the like which slide the optical pickup 21. The optical disk rotating mechanism 23 is equipped with a mechanism which rotates an optical disk. Accordingly, the optical path length of the optical pickup 21 is the distance from the laser diode provided in the optical pickup 21 to the optical disk (not shown in FIG. 8) rotated by the optical disk rotating mechanism 23.

By providing the optical disk system of the present embodiment with the optical pickup described in Embodiment 1 or Embodiment 2, it is possible to construct an optical disk system which can operate at a feed-back noise level below the allowable feed-back noise level required for such system.

As is clear from the above description, the present optical disk system makes it unnecessary to carry out complicated noise measuring processes or observations using a large-scale Michelson interferometer, and it was possible to construct an optical disk system which can operate at a feed-back noise level below a prescribed feed-back noise level.

As described above, the present invention makes it unnecessary to carry out complicated noise measuring processes or observations using a large-scale Michelson interferometer, and it is possible to construct an optical pickup having a feed-back noise level below a prescribed feed-back noise level, and an optical disk system provided with such optical pickup.

In the optical pickup according to the present invention, it is possible to guarantee operation at a feed-back noise level below a prescribed feed-back noise level, and by providing such optical pickup in an optical disk system, it becomes possible to construct an optical disk system which can operate at a feed-back noise level below a prescribed feed-back noise level.

What is claimed is:

1. An optical pickup for reading information written on an optical disk, said optical pickup having an optical path length and a structure comprising the following elements:
    (a) vertical multi-mode laser diode which emits light having a visibility curve and a coherent distance;
    (b) means for focusing the emitted light from the laser onto the optical disk; and
    (c) means for receiving reflected light from the optical disk in order to read the information written on the optical disk;
    wherein elements (a), (b) and (c) are arranged so that the coherent distance of the emitted light from the laser diode is shorter than the optical path length of the optical pickup and said coherent distance is the distance from the laser diode to a point where an envelope of said visibility curve forms $1/e^2$ where e is the natural logarithm base.

2. A method of adjusting an optical pickup, having an optical path length, said optical pickup being adapted for reading information written on an optical disk, said method comprising the steps of:
    providing a laser diode which is driven by a driving electric current created by superimposing a high-frequency signal on a direct current in order to emit light, having a visibility curve, in a vertical multi-mode;
    providing means for focusing the emitted light from the laser diode onto the optical disk;
    providing means for receiving reflected light from the optical disk in order to read the information written of the optical disk; and
    adjusting the driving electric current so that the coherent distance of the emitted light from the laser is shorter than the optical path length of the optical pickup and said coherent distance is the distance from the laser diode to a point where an envelope of said visibility curve forms is $1/e^2$ where e is the natural logarithm base.

3. An optical disk system, said optical pickup having an optical path length and a structure comprising the following elements:
    (a) an optical pickup, having an optical path length, said optical pickup being adapted for reading information written on an optical disk comprising a vertical multi-mode laser diode which emits light having a visibility curve,
    (b) means for focusing the emitted light from the laser onto the optical disk,
    (c) means for receiving reflected light from the optical disk in order to read the information written on the optical disk;
    (d) an optical pickup sliding mechanism and
    (e) an optical pickup rotating mechanism;
    wherein elements (a), (b), (c), (d) and (e) are arranged so that the coherent distance of the emitted light front the laser diode is shorter than the optical path length of the optical pickup and said coherent distance is the distance from the laser diode to a point where an envelope of said visibility curve forms $1/e^2$ where e is the natural logarithm base.

* * * * *

UNITED STATES PATENT AND TRADEMARK OFFICE
CERTIFICATE OF CORRECTION

PATENT NO. : 7,388,823 B2  Page 1 of 1
APPLICATION NO. : 10/392074
DATED : June 17, 2008
INVENTOR(S) : Naotaro Nakata It is certified that error appears in the above-identified patent and that said Letters Patent is hereby corrected as shown below:

On the Title Page, Item (73)

Assignee: "RHOM Co., Ltd" should read --ROHM Co., Ltd--.

Column 8, lines 20 to 21 (claim 2), "of the optical disk" should read --on the optical disk--.

Column 8, lines 46 to 47 (claim 3), "front the laser diode" should read --from the laser diode--.

Signed and Sealed this

Fourteenth Day of October, 2008

JON W. DUDAS
*Director of the United States Patent and Trademark Office*